United States Patent
Roknsharifi

(10) Patent No.: US 9,513,378 B2
(45) Date of Patent: Dec. 6, 2016

(54) CURRENT MODE DESIGN FOR MULTIPLEXING POSITIONING DATA OF DETECTOR BLOCKS

(71) Applicant: Siemens Medical Solutions USA, Inc., Malvern, PA (US)

(72) Inventor: Melika Roknsharifi, Knoxville, TX (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/817,431

(22) Filed: Aug. 4, 2015

(65) Prior Publication Data

US 2016/0041277 A1 Feb. 11, 2016

Related U.S. Application Data

(60) Provisional application No. 62/034,199, filed on Aug. 7, 2014.

(51) Int. Cl.
*G01T 1/26* (2006.01)
*G01T 1/164* (2006.01)

(52) U.S. Cl.
CPC .................... *G01T 1/1647* (2013.01)

(58) Field of Classification Search
CPC ........................................ G01T 1/24
See application file for complete search history.

(56) References Cited

U.S. PATENT DOCUMENTS

| | | | |
|---|---|---|---|
| 2005/0035297 A1* | 2/2005 | Crosetto | 250/367 |
| 2014/0021354 A1* | 1/2014 | Gagnon et al. | 250/362 |

* cited by examiner

*Primary Examiner* — David Porta
*Assistant Examiner* — Hugh H Maupin

(57) ABSTRACT

Disclosed herein too is an apparatus for measuring radiation, comprising an array of photodetectors for receiving the radiation; for each photodetector of the array of photodetectors, an anode buffer for generating an electronic signal indicative of receiving the radiation at the photodetector; and a mini-block corresponding to the photodetector array, the mini-block including a summation circuit for calculating an energy of the received radiation from the electronic signals corresponding to each photodetector of the array of photodetectors, and a position circuit for calculating a coordinate of the energy received at the array of photodetectors.

14 Claims, 5 Drawing Sheets

CURRENT MODE DESIGN FOR MULTIPLEXING POSITIONING DATA OF DETECTOR BLOCKS

RELATED APPLICATIONS

This application claims the benefit of U.S. Provisional Patent Application No. 62/034,199 filed on Aug. 7, 2014, the entire contents of which are hereby incorporated by reference.

BACKGROUND

This disclosure relates to a design for detector blocks in a radiation detection device. In particular, this disclosure relates to a current mode design for multiplexing positioning data of detector blocks.

With advances in radiation detection and computer technologies, imaging has become a useful tool in industry, medicine, and biology. Industrial applications include planar and tomographic X-ray imaging to localize and to study structural defects. Medical and biological applications include X-ray computed tomography, positron emission tomography (PET) and single photon emission computed tomography (SPECT), amongst others. The drive for improved image resolution has led to increasing the number of detectors while simultaneously decreasing the size of the detectors. As detector size decreases, there is a need to redesign and/or operate the detectors more efficiently, so as to remove and/or reduce associated circuitry.

SUMMARY

Disclosed herein is a method of radiation detection, including: receiving radiation at least a second sensor of a detector having a first sensor and the second sensor; generating a signal in response to the received radiation at the second sensor; and using a circuit associated with the first sensor to: calculate, at the first sensor, a representation of the signal generated at the second sensor; and perform a calculation on the representation of the signal to determine a parameter of the radiation.

Disclosed herein too is an apparatus for measuring radiation, including: a detector for receiving the radiation, the detector including a first photodetector array and a second photodetector array; a first chip associated with the first photodetector array including a first mini-block circuit for generating first signals in response to the radiation at the first chip, and a first summation circuit; and a second chip associated with the second photodetector array including a second mini-block circuit for generating second signals in response to the radiation at the second chip; wherein the second signals are processed at the first summation circuit to determine a parameter of the radiation.

Disclosed herein too is an apparatus for detecting radiation, including: a detector comprising a plurality of sensors, each sensor having a photodiode array and a mini-block for calculating energy and position coordinates of a radiation signal received at the sensor; a summation circuit associated with a first of the plurality of sensors configured to: receive the calculated energy and position coordinates from the other of the plurality of sensors, calculating a representation of the received energies and position coordinates with respect to the first of the plurality of sensors, and performing calculations on the representation of the received energies and position coordinates to detect the radiation.

DETAILED DESCRIPTION

Figure 1:
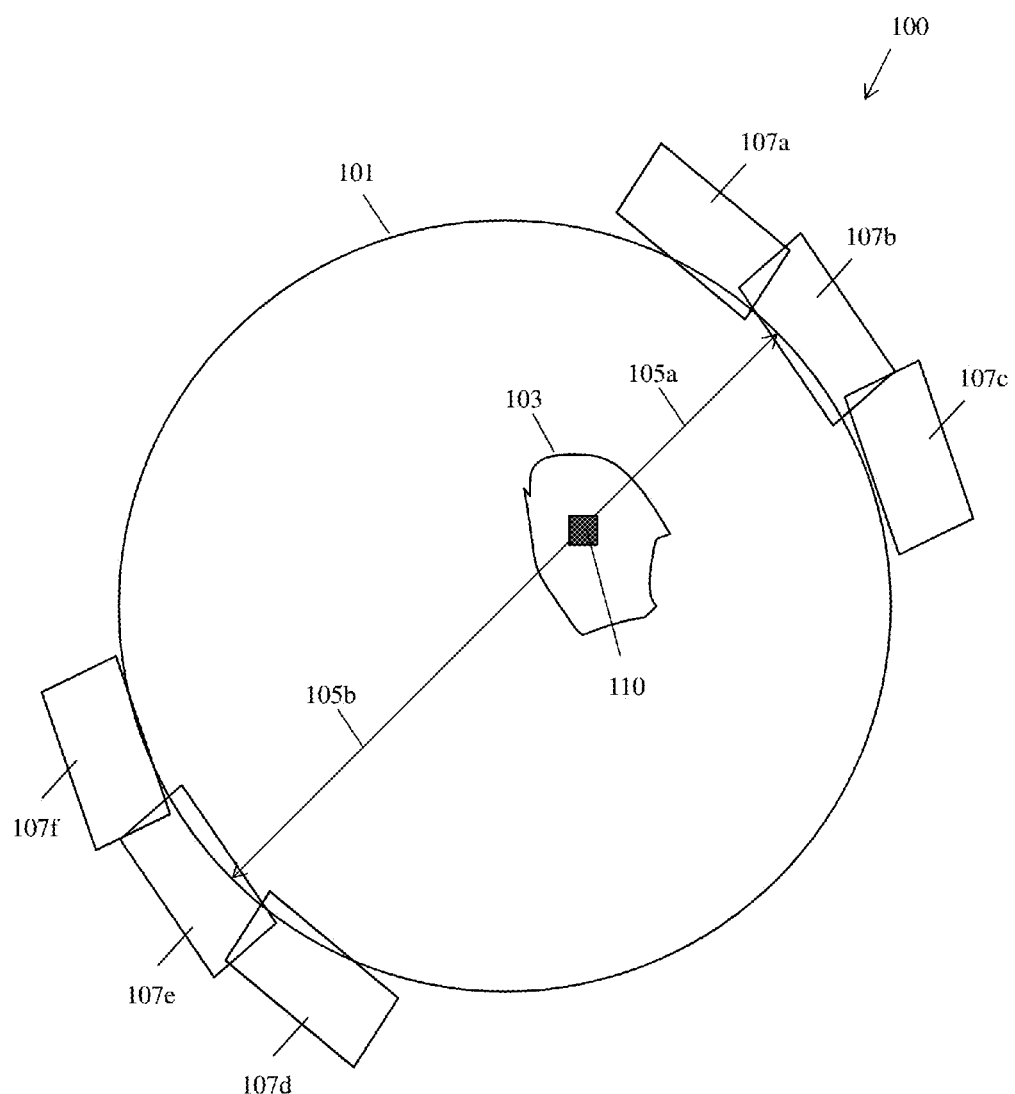
FIG. 1 shows an illustrative embodiment of a positron emission tomography (PET) scanning device 100 suitable for use with the detector block detailed herein.

FIG. 1 depicts an illustrative embodiment of a positron emission tomography (PET) scanning device 100 suitable for using the methods and apparatus disclosed herein. An object 103 is disposed between a ring 101 of sensors 107 including a group of sensors 107a-107c and a group of sensors 107d-107f that are 180 degrees opposed to the sensors 107a-107c. The object 103 is generally a biological material that includes positron-emitting radionuclides. The radionuclides emit gamma rays 105a, 105b which are captured by the sensors 107. In PET, a radionuclide 110 generates two gamma rays (105a, 105b), which travel in opposite directions from each other (180 degrees apart). The position of the source of the gamma rays (i.e., the radionuclide 110) is detected by calculating a time difference between the time at which a first (105a) of the gamma rays is received at the first group of sensors 107a-107c and the time at which a second (105b) of the gamma rays is received at the second group of sensors 107d-107f. This technique is called time of flight or TOF. The multiple sensors 107a-107f may cover a 360 degree span of the ring 101 in order to capture gamma rays 105a, 105b regardless of the direction in which the gamma ray 105a, 105b are directed. Alternatively, the multiple sensors may cover an arc of the ring that is less than 360 degrees if desired. Signals from the sensors 107a-107f may be sent to a processor or circuitry for processing. In various embodiments, the location and energy of radiation received at a first sensor (e.g., sensor 107a) and/or the location and energy of radiation received at a second sensor (e.g., sensor 107b) may be determined using the methods disclosed herein.

Figure 2:
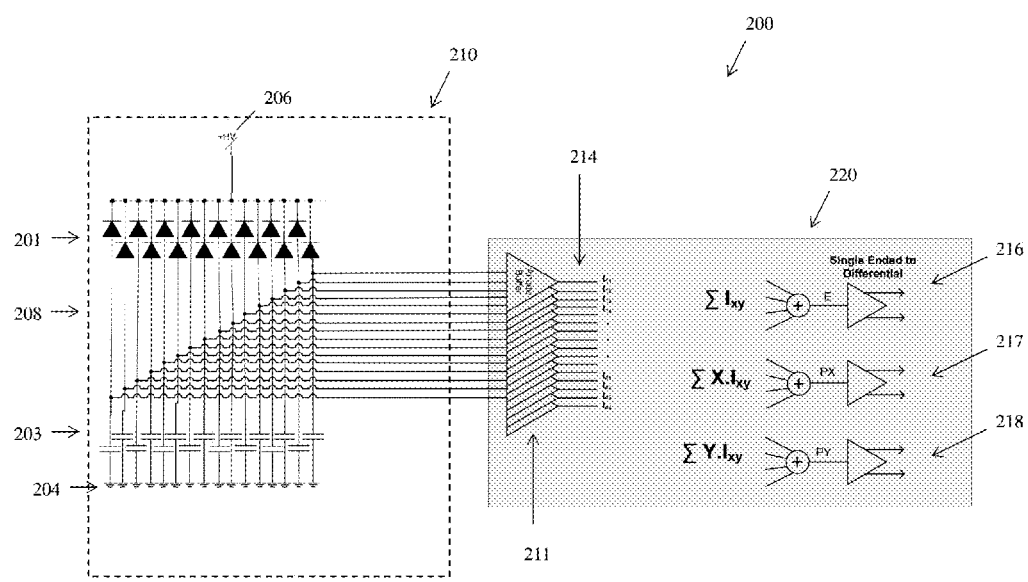
FIG. 2 is a schematic depiction of an exemplary electronic diagram of a mini-block for measuring radiation such as from the PET scanning device of FIG. 1 and determining an energy and location of the radiation.

FIG. 2 depicts an electronic diagram 200 of a sensor for measuring a radiative signal such as that generated in the exemplary PET scanning device 100 of FIG. 1 and determining an energy and location of the radiative signal at the sensor. The electronic diagram 200 includes a photodiode array 210 in electronic communication with a mini-block ASIC (Application Specific Integrated Circuit) circuit 220. The exemplary photodiode array 210 includes 16 photodiode circuits. It is understood however that in alternative embodiments, any number of photodiode circuits may be provided in a photodiode array 110. Each photodiode circuit includes a silicon photomultiplier (SiPM) 201 for receiving the emission radiation (e.g., gamma emission radiation) and generating an electronic signal in response to the received radiation. Although the SiPMs 201 are shown as linearly aligned in FIG. 2, it is to be understood that the SiPMs 201 may be arranged in any selected configuration. For example, the SiPMs 201 may be arranged in a 4×4 array or in an 8×2 array.

Each SiPM 201 is in electrical communication with a high voltage line 206 and is separated from ground 204 via a capacitor 203. Radiation impinging on a selected SiPM 201 produces an electrical current in its associated circuit. A tap 208 disposed between the capacitor 203 and SiPM 201 directs an electrical current signal representative of the radiation signal to an anode buffer 211 of the mini-block ASIC circuit 220 for calculations.

The mini-block ASIC circuit 220 calculates various parameters related to the radiation such as the energy and position for the received radiation, using the electronic signals generated by the SiPMs 201 in response to the received radiation. In order to create the energy and positioning signals, the electronic signal generated by radiation impacting the SiPM 201 is directed to an associated anode buffer 211 of the mini-block circuit 220. The mini-block ASIC circuit 220 includes 16 anode buffers 211, one anode buffer for each of the SiPMs 201 in the photodiode array 200. Each anode buffer 211 receives an electrical signal from its corresponding SiPM 201 and generates a current output 'I' (214). Therefore, 16 current outputs 214 are generated, one by each of the anode buffers 204. The 16 current outputs 214 are multiplexed to calculate energy terms (represented by summation diagram 216), x-coordinates (represented by x-weighted summation diagram 217) and y-coordinates (represented by y-weighted summations diagram 218). Details of these summations are discussed in further detail with respect to FIG. 2.

As discussed below, the mini-block ASIC circuit 220 is operative to calculate various values that are used to create an output current ratio. In one aspect, the output current ratio provides a position of the electronic signal within a photodetector array 210 comprising multiple mini-block ASIC circuits 220. An exemplary output current ratio is based on the location of the SiPM in the photodetector array 210. In addition, a direct sum of all output currents may be used to derive an energy of the radiative signal and the sum of position-weighted currents may be used to form a ratio that indicates a location of the radiation signal at the photodetector array 210 and thus, the location of the radiation signal at the sensor.

Figure 3:
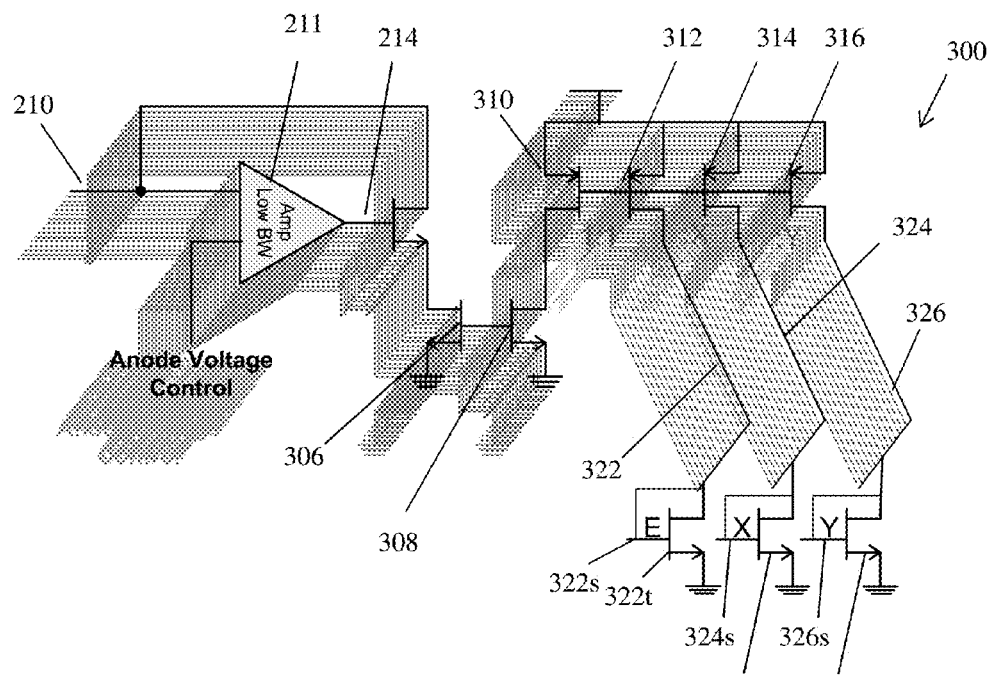
FIG. 3 depicts an exemplary circuit diagram for determining radiation energy as well as position variables for the received radiation using electronic signals generated from the received radiation.

FIG. 3 shows an exemplary circuit diagram 300 for determining radiation energy as well as position variables for the received radiation. The exemplary circuit diagram 300 shows a plurality of anode buffers 211 shown stacked upon each other. Each anode buffer 211 receives an electronic signal from its corresponding SiPM 201 and produces an electrical current output 214 in response. The current output 214 may be referred to herein as an energy signal, as it represents the radiation impinging the associated SiPM 201. The current output 214 is used as input to multiple current mirrors to calculate parameters such as energy of the radiation received at the photodiode array 210 as well as an x-coordinate and y-coordinate for the radiative signal. A current mirror is a circuit designed to copy a current through one active device by controlling the current in another active device of a circuit, keeping the output current constant regardless of loading.

Figure 4:
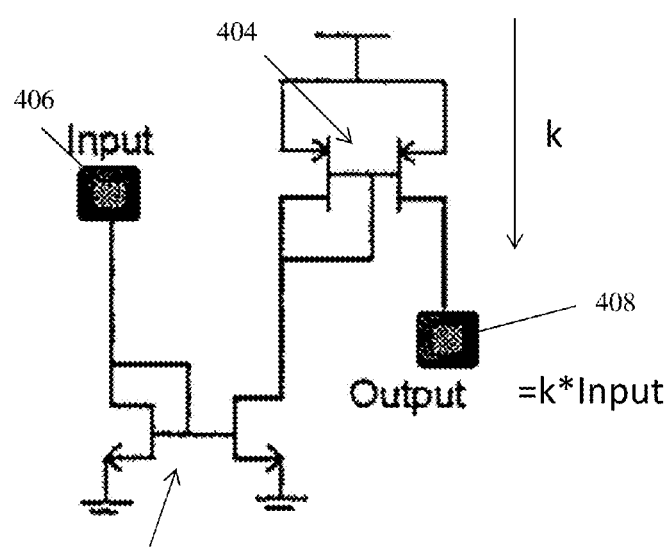
FIG. 4 shows an exemplary current mirror for use in calculating the sum of energies and/or position coordinates.

FIG. 4 shows an exemplary current mirror 400 for use in calculating energies and/or position coordinates. The current mirror 400 comprises two pairs 402, 404 of transistors. Each pair 402, 404 of transistors includes transistors that have their gates being in electrical communication with one another. The arrangement of the transistor pairs is such that an input signal 406 is copied at output signal 408. Additionally, a signal may be input into the second pair 404 of transistors in order or alternatively multiply the input signal 406 by a selected proportionality value 'k' thereby providing an output signal 408 that is 'k' times the input signal 406. In various embodiments of the present disclosure, the proportionality value is an x-coordinate or a y-coordinate related to the photodetector array 210.

Returning now to FIG. 3, three current mirrors are represented. Transistors 306, 308, 310 and 312 form a first current mirror that generates energy signals 322. Transistors 306, 308, 310 and 314 form a second current mirror that generates x-coordinate values 324 associated with the energy signals 322. Transistors 306, 308, 310 and 316 form a third current mirror that generates y-coordinate values 326 associated with the energy signals 322.

Transistor 322t sums the energy output signals 322 to obtain a total energy 322s received at the photodetector array 210. Transistor 324t sums the x-coordinate values 324 to obtain an x-coordinate 324s representing the location of the energy at the photodetector array 210. Transistor 326t sums the y-coordinate values 326 to obtain a y-coordinate 326s representing the location of the energy at the photodetector array 210.

Figure 5:
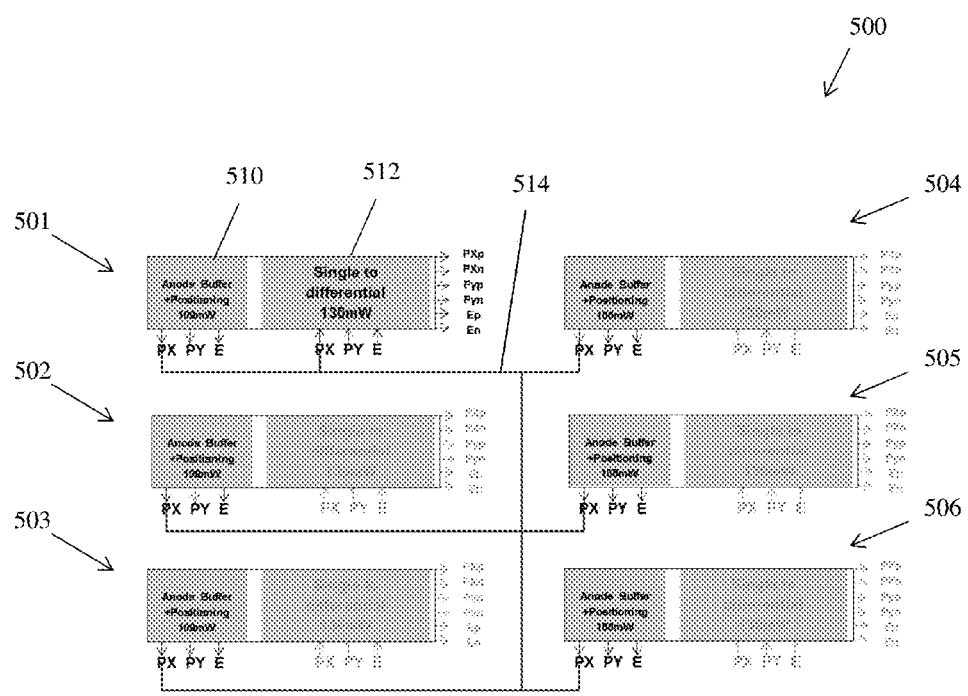
FIG. 5 shows an exemplary array of mini-blocks in one embodiment of the present disclosure.

FIG. 5 shows an exemplary detector block 500 comprising an array of chips 501-506 for processing signals from the PET scan device 100 in one embodiment of the present disclosure. Chip 501 includes mini-block ASIC circuit 510 (such as shown in FIG. 3) and a corresponding summing section 512. Chips 502 to 506 similarly include the same sections as chip 501 (i.e., mini-block ASIC circuit 510 and summing section 501). However, the associated summing sections of the chips 502 to 506 can be turned off through I2C (inter-integrated circuit) communication. The chips 501 to 506 of the detector block 500 form a two-dimensional array. However, it is to be understood that a detector block 500 may include any number of chips in various embodiments of the present disclosure, forming any array configuration. For explanatory purposes, chip 501 is referred to as a primary chip and chips 502 to 506 are referred to as secondary chips. The mini-block ASIC circuit of each chip provides output for x-coordinate values (PX), y-coordinate values (PY) and energy values (E). The PX outputs of each mini-block ASIC circuit are linked to PX input of the summing section 512 of the primary chip 501 via a communication link such as a wire or conductor. Similarly, although not shown explicitly in FIG. 5, the PY output of each mini-block are linked to PY input of the summing section 512 of the primary chip 501 and the E output of each mini-block ASIC circuit are linked to E input of the summing section 512 of the primary chip 501. Thus, computations for the secondary chips 502 to 506, including energy calculations and position calculations are performed on the primary chip 501, using methods discussed below with respect to FIGS. 6 and 7. The summing sections of the secondary chips 502 to 506 may therefore be turned off to save energy.

The input to the summing section 512 of the primary chip 501 is a sum of all relevant signals from the other chips 502 to 506. There is therefore a high capacitive node on the input signals to the summing section 512. However, the output of the summing section 512 is a low-capacitive node in comparison to the input to the summing section 512. The output signal of the summing section 512 may therefore be read using a circuit employing a reasonable resistor value, as discussed below.

The value of resistors and capacitors are very dependent on the bandwidth and the signal power. In the present embodiment, a selected bandwidth of 10 MHz is exemplary. An RC time constant for such a bandwidth is therefore 16 nanosecond, based on $(1/RC)=2\pi f$. Eight mini-blocks connected together provide a node having about 120 picoFarads (pF) of parasitic capacitance. Therefore, an equivalent exemplary resistance at that node is below R=133 ohm in order to obtain the selected bandwidth. In order to read a voltage that is significantly greater than noise levels, a large current pulse is required to be sent through this relatively small resistor value of R=133 ohm.

High DC current biases are required to preventing signals from clipping higher current pulses. Therefore in one embodiment, the current signal is attenuated and so that the signal current pulse is in a range from about 100 microamperes ($\mu$A) to about 500 $\mu$A. Within this current range, the 133 ohm resistor is considered small, since the resulting voltage through the resistor is slightly above the noise level. The current mirroring technique (see FIG. 2) reduces the equivalent resistance at the output node without impacting the bandwidth or the power consumption of the system. An input node to the current mirror has a capacitance of about 120 pF and a resistance around 133 ohm. An output node of the current mirror has a capacitance of about 12 pF, thereby allowing for a higher equivalent resistor (i.e., 1330 ohm).

Figure 6:
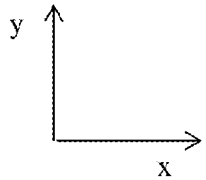
FIG. 6 discloses the naming convention for received signal associated with each SiPM at a mini-block in one embodiment of the present disclosure.

FIG. 6 shows a representation of a naming convention 600 for received signals associated with each SiPM associated with a mini-block in one embodiment of the present disclosure. FIG. 6 shows a 4×4 array of cells, where each cell represents a photodetector (SiPM) of the photodetector array of FIG. 2. The cells are indexed as E0 through E15. To determine an x-location of a signal at the mini-block, the energies at each cell are multiplied by an x-coordinate associated with the cell. These position-weighted energies are summed as shown in Equation 1:

$$X = \frac{\sum_{i=0}^{3} E_i + 2 \cdot \sum_{i=4}^{7} E_i + 3 \cdot \sum_{i=8}^{11} E_i + 4 \cdot \sum_{i=12}^{15} E_i}{4 \cdot \sum_{i=0}^{15} E_i} \quad \text{Eq. (1)}$$

where $E_i$ represents the current (energy) signal provided by the $i^{th}$ SiPM (via $i^{th}$ anode buffer). Each summation in the numerator is multiplied a number representing a column in which the cell resides. Thus, the first summation in the numerator is multiplied by "1", the second summation in the numerator is multiplied by "2", the third summation in the numerator is multiplied by "3" and the fourth summation in the numerator is multiplied by "4". The denominator includes a summation of all of the energies obtained by the SiPMs of the mini-block. This summation is multiplied by 4. Thus, the X values calculated by Eq. (1) provides a fraction or ratio indicative of the X-position of the received signal at the mini-block. A similar equation may be used to determine a ratio indicative of the Y-position of the received signal at the mini-block.

Figure 7:
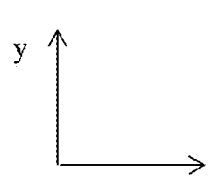
FIG. 7 shows a first mini-block adjacent to a second mini-block.

FIG. 7 shows a first mini-block adjacent a second mini-block. The first mini-block belongs to a first chip shown in FIG. 5 and the second mini-block belongs to a second chip shown in FIG. 5. Using the methods outlined in Eq. (1), the X-coordinate in the mini-blocks may be calculated from the energy signals from Eq. (2):

$$X = \frac{\sum_{i=0}^{3} E_{0i} + 2 \cdot \sum_{i=4}^{7} E_{0i} + 3 \cdot \sum_{i=8}^{11} E_{0i} + 4 \cdot \sum_{i=12}^{15} E_{0i}}{4 \cdot \left(\sum_{i=0}^{15} E_{0i} + \sum_{i=0}^{15} E_{1i}\right)} +$$

$$\frac{5 \cdot \sum_{i=0}^{3} E_{1i} + 6 \cdot \sum_{i=4}^{7} E_{1i} + 7 \cdot \sum_{i=8}^{11} E_{1i} + 8 \cdot \sum_{i=12}^{15} E_{1i}}{4 \cdot \left(\sum_{i=0}^{15} E_{0i} + \sum_{i=0}^{15} E_{1i}\right)} \quad \text{Eq. (2)}$$

Eq. (2) includes a summation of two terms, the first term represented X-coordinate for the first mini-block and the second term representing an X-coordinate for the second mini-block. Notably, the column numbering system used in the second term is a continuation of the column numbering system used in the first term. The energy variables in the numerator are now represented by $E_{k,i}$, where k represents an index number of the mini-block and 'i' represents the index number for the cells within each mini-block. The denominator includes the summation of the energies over both mini-blocks. For more than two mini-blocks, the denominator will include the summation of the energies over the entirety of the mini-blocks. The numerator of each term includes the summation over the cells of each column of the second mini-block. The numerator of the first term includes the summation over the cells of columns 1, 2, 3 and 4. The number of the second term includes the summation over the cells of the second mini-block. The columns in the second mini-block are labelled 5, 6, 7 and 8 to continue the numbering system that started at the first mini-block. Equation (2) may be rewritten as shown in Eq. (3):

$$X = \frac{\sum_{i=0}^{3} E_{0i} + 2 \cdot \sum_{i=4}^{7} E_{0i} + 3 \cdot \sum_{i=8}^{11} E_{0i} + 4 \cdot \sum_{i=12}^{15} E_{0i}}{4 \cdot \left(\sum_{i=0}^{15} E_{0i} + \sum_{i=0}^{15} E_{1i}\right)} +$$

$$\frac{1 \cdot \sum_{i=0}^{3} E_{1i} + 2 \cdot \sum_{i=4}^{7} E_{1i} + 3 \cdot \sum_{i=8}^{11} E_{1i} + 4 \cdot \sum_{i=12}^{15} E_{1i}}{4 \cdot \left(\sum_{i=0}^{15} E_{0i} + \sum_{i=0}^{15} E_{1i}\right)} +$$

$$\frac{4 \cdot \sum_{i=0}^{3} E_{1i} + 4 \cdot \sum_{i=4}^{7} E_{1i} + 4 \cdot \sum_{i=8}^{11} E_{1i} + 4 \cdot \sum_{i=12}^{15} E_{1i}}{4 \cdot \left(\sum_{i=0}^{15} E_{0i} + \sum_{i=0}^{15} E_{1i}\right)} \quad \text{Eq. (3)}$$

wherein the second term of Eq. (2) has been rewritten as two new terms. The first of the two new terms calculates an x-coordinate based on a coordinate system of the second mini-block and the second of the two new terms translates between the first mini-block and the second mini-block. Eq. (3) may be further rewritten as:

$$X = \frac{\sum_{i=0}^{3} E_{0i} + 2 \cdot \sum_{i=4}^{7} E_{0i} + 3 \cdot \sum_{i=8}^{11} E_{0i} + 4 \cdot \sum_{i=12}^{15} E_{0i}}{4 \cdot \left( \sum_{i=0}^{15} E_{0i} + \sum_{i=0}^{15} E_{1i} \right)} +$$

$$\frac{1 \cdot \sum_{i=0}^{3} E_{1i} + 2 \cdot \sum_{i=4}^{7} E_{1i} + 3 \cdot \sum_{i=8}^{11} E_{1i} + 4 \cdot \sum_{i=12}^{15} E_{1i} + 4 \cdot \sum_{i=0}^{15} E_{1i}}{4 \cdot \left( \sum_{i=0}^{15} E_{0i} + \sum_{i=0}^{15} E_{1i} \right)},$$

Eq. (4)

or $$X = \frac{\sum_{i=0}^{3} E_{0i} + 2 \cdot \sum_{i=4}^{7} E_{0i} + 3 \cdot \sum_{i=8}^{11} E_{0i} + 4 \cdot \sum_{i=12}^{15} E_{0i}}{4 \cdot \left( \sum_{i=0}^{15} E_{0i} + \sum_{i=0}^{15} E_{1i} \right)} +$$

$$\frac{1 \cdot \sum_{i=0}^{3} E_{1i} + 2 \cdot \sum_{i=4}^{7} E_{1i} + 3 \cdot \sum_{i=8}^{11} E_{1i} + 4 \cdot \sum_{i=12}^{15} E_{1i}}{4 \cdot \left( \sum_{i=0}^{15} E_{0i} + \sum_{i=0}^{15} E_{1i} \right)} + \frac{\sum_{i=0}^{15} E_{1i}}{\left( \sum_{i=0}^{15} E_{0i} + \sum_{i=0}^{15} E_{1i} \right)}$$

Eq. (5)

Eq. (5) indicates that the translation term of Eq. (3) is a ratio of energies. Specifically, for the exemplary two sensors system discussed herein, the ratio of energies is a ratio of the energy of the second mini-block to the total energy of the first and second mini-block. The ratio of calculated energies therefore translates the x-coordinate value from one mini-block to another mini-block, allowing the x-coordinate of the second mini-block to be operated upon at the first mini-block. A similar equation to that of Equation (5) may be determined for y-coordinates. An equation similar to Eq. (5) for additional mini-bocks includes a term that is a ratio of energies of the additional mini-blocks to the total energy for all of the mini-blocks.

This system is advantageous because it provides a mechanism to increase the number of detectors by decreasing the size of the detectors. This system is also advantageous in that it permits the use of a current based structure instead of a resistive network structure, which facilitates an improvement in the dynamic range of the reading signals. The additional dynamic range may be used to increase the number of multiplexed signals and to reduce the number of ADC channels that are used to read the signal generated from ASIC. The use of fewer ADC channels prevents the use of slower FPGAs (which are responsible for reading these ADC channels) and this helps reduce the overall system cost.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," may therefore encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" may, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The features of the system and method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps disclosed herein may be performed automatically or wholly or partially in response to user command. An activity (including a step) performed automatically is performed in response to executable instruction or device operation without user direct initiation of the activity.

The disclosed systems and processes are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of the disclosed system. Further, any of the functions and steps provided in this disclosure may be implemented in hardware, software or a combination of both and may reside on one or more processing devices located at any location of a network linking the elements the disclosed system or another linked network, including the Internet.

The term "and/or" is used herein to mean both "and" as well as "or". For example, "A and/or B" can be construed to mean A, B, A and B, or a combination thereof.

The transition term "comprising" is inclusive of the transition terms "consisting essentially of" and "consisting of".

While this disclosure describes exemplary embodiments, it will be understood by those skilled in the art that various changes may be made and equivalents may be substituted for elements thereof without departing from the scope of the disclosed embodiments. In addition, many modifications may be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method of radiation detection, comprising:
   receiving radiation at least a second sensor of a detector having a first sensor and the second sensor;
   generating a signal in response to the received radiation at the second sensor; and
   using a circuit associated with the first sensor to:
   calculate, at the first sensor, a representation of the signal generated at the second sensor, wherein a position coordinate of the signal generated at the second sensor is translated into a coordinate system of the first sensor using a ratio of total energy recorded at the second sensor to a sum of total energies recorded at the first and second sensors, and
   perform a calculation on the representation of the signal to determine a parameter of the radiation.

2. The method of claim 1, wherein the parameter includes at least one of: (i) an energy of the radiation; and (ii) a location at which the radiation is received.

3. The method of claim 1, wherein the first sensor includes a first array of photodetectors and the second sensor includes a second array of photodetectors.

4. The method of claim 3, wherein a first mini-block circuit generates the signal for the first array of photodetectors and a second mini-block circuit generates the signal for the second array of photodetectors, the method further comprising calculating position coordinates of the radiation using the energies at the first mini-block and the second mini-block.

5. An apparatus for measuring radiation, comprising:
   a detector for receiving the radiation, the detector including a first photodetector array and a second photodetector array;
   a first chip associated with the first photodetector array including a first mini-block circuit for generating a first signal in response to the radiation at the first photodetector array, and a first summation circuit; and
   a second chip associated with the second photodetector array including a second mini-block circuit for generating a second signal in response to the radiation at the second photodetector array;
   wherein the first signal and second signal are processed at the first summation circuit to determine a parameter of the radiation, wherein a position of radiation at the second photodetector array is represented at the first summation circuit by translating a position coordinate of the second mini-block into a coordinate system of the first mini-block using a ratio of total energy recorded at the second mini-block to a sum of total energies recorded at the first and second mini-blocks.

6. The apparatus of claim 5, wherein the second chip includes a second summation circuit and the second summation circuit is turned off while the first summation circuit determines the parameter of the radiation.

7. The apparatus of claim 5, wherein each mini-block circuit includes a plurality of anode buffers, each anode connected to a photodetector of the photodetector array.

8. The apparatus of claim 7, wherein the first summation circuit determines the coordinate of the radiation of the electronic signals by weighting the signal energy at the photodetector with a position coordinate associated with the photodetector.

9. The apparatus of claim 8, wherein the ratio of energies is a ratio of the energy at the second detector to a sum of the energy at the first detector and second detector.

10. An apparatus for detecting radiation, comprising:
    a detector comprising a plurality of sensors, each sensor having a photodiode array and a mini-block for calculating energy and position coordinates of a radiation signal received at the sensor;
    a summation circuit associated with a first of the plurality of sensors configured to:
    receive the calculated energy and position coordinates from the other of the plurality of sensors,
    calculating a representation of the received energies and position coordinates in the with respect to the first of the plurality of sensors, wherein a position of radiation at a mini-block of another of the plurality of sensors is represented at the summation circuit by translating a position coordinate of the mini-block of the other of the plurality of sensors into a coordinate system of a mini-block of the first of the plurality of sensors using a ratio of total energy recorded at the other mini-block to a sum of total energies recorded at the other mini-block and the mini-block of the first of the plurality of sensors, and
    performing calculations on the representation of the received energies and position coordinates to detect the radiation.

11. The apparatus of claim 10, wherein calculating the representation of the received energies and position coordinates further comprises defining a coordinate system centered on the first sensor and defining the energies and position coordinates of the other sensors using the coordinate system centered on the first sensor.

12. The apparatus of claim 10, wherein the detector block is included in a positron emission tomography device.

13. The apparatus of claim 10, wherein the plurality of sensors of the detector block form at least one of: (i) a one-dimensional array of sensors; (ii) a two-dimension array of sensors; (iii) a ring of sensors; and (iv) an arc of sensors along a ring.

14. The apparatus of claim 10, wherein a capacitive node of the output of the first summation circuit is less than a capacitive node of the input of the first summation circuit.

* * * * *